(12) United States Patent
Wang et al.

(10) Patent No.: US 6,598,036 B1
(45) Date of Patent: Jul. 22, 2003

(54) METHOD FOR SERVING ENGINEERING RULES ON A NETWORK THROUGH SERVLET AND APPLET

(75) Inventors: Nanxin Wang, Novi, MI (US); Beverly Joyce Becker, Harper Woods, MI (US); Gregory Allen Kaepp, Dearborn, MI (US); Fang Liu, Ann Arbor, MI (US); Zhengyu Lei, Westland, MI (US); Yan Xue, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/542,376

(22) Filed: Apr. 4, 2000

(51) Int. Cl.[7] .............................................. G06F 15/18
(52) U.S. Cl. ........................................................ 706/61
(58) Field of Search ...................... 706/61, 11; 709/203

(56) References Cited

U.S. PATENT DOCUMENTS

| | | |
|---|---|---|
| 4,595,982 A | 6/1986 | Burt |
| 4,648,044 A | 3/1987 | Hardy et al. |
| 4,658,370 A | 4/1987 | Erman et al. |
| 4,803,641 A | 2/1989 | Hardy et al. |
| 4,829,426 A | 5/1989 | Burt |
| 4,884,218 A | 11/1989 | Agnew et al. |
| 4,930,071 A | 5/1990 | Tou et al. |
| 4,931,951 A | 6/1990 | Murai et al. |
| 4,965,741 A | 10/1990 | Winchell et al. |
| 5,197,116 A | 3/1993 | Katoh et al. |
| 5,228,116 A | 7/1993 | Harris et al. |
| 5,325,466 A | 6/1994 | Kornacker |
| 5,338,188 A | 8/1994 | Yocum |
| 5,347,614 A | 9/1994 | Yamada et al. |
| 5,414,798 A | 5/1995 | Nigawara et al. |
| 5,418,889 A | 5/1995 | Ito |
| 5,446,885 A | 8/1995 | Moore et al. |
| 5,504,840 A | 4/1996 | Hiji et al. |

(List continued on next page.)

FOREIGN PATENT DOCUMENTS

EP   0 508 308 A2   4/1992

OTHER PUBLICATIONS

Frameworks for Component–Based Client/Server Computing, Scott M. Lewandowski; Department of Computer Science, Brown University, ACM Computing Surveys, vol. 30, No. 1, Mar. 1998, ©ACM 0360–0300/98/0300–0300.*

(List continued on next page.)

*Primary Examiner*—John Follansbee
*Assistant Examiner*—Michael B. Holmes
(74) *Attorney, Agent, or Firm*—Damian Porcari

(57) ABSTRACT

A method is disclosed for determining the correctness of proposed values or data for engineering parameters. The method incorporates the use of a server side computer and a client side computer connected to each other via an electronic network. The method includes the steps of obtaining a knowledge base of data. The knowledge base is stored on the server side computer. Proposed values or data are generated at the client side computer using an applet. The proposed data is then transmitted over the network from the client side computer to the server side network. The proposed data is then compared against the knowledge base of data using a servlet designed to invoke and utilize computers other than the server side computer that may have rules or facts necessary to test the proposed data. The results are prepared and then transmitted from the server side computer to the client side computer. The client side computer does not require a proprietary application to be resident therein. It merely requires a web browser to access and utilize all of the information resident in the knowledge base stored in the server side computer.

18 Claims, 5 Drawing Sheets

U.S. PATENT DOCUMENTS

| | | | | |
|---|---|---|---|---|
| 5,717,832 | A | * 2/1998 | Steimle et al. | 706/33 |
| 5,748,943 | A | 5/1998 | Kaepp et al. | |
| 5,768,510 | A | * 6/1998 | Gish | 709/203 |
| 5,799,293 | A | 8/1998 | Kaepp | |
| 5,812,668 | A | * 9/1998 | Weber | 705/79 |
| 5,815,657 | A | * 9/1998 | Williams et al. | 713/200 |
| 5,848,246 | A | * 12/1998 | Gish | 709/228 |
| 5,850,446 | A | * 12/1998 | Berger et al. | 705/79 |
| 5,924,116 | A | * 7/1999 | Aggarwal et al. | 711/112 |
| 5,928,323 | A | * 7/1999 | Gosling et al. | 709/203 |
| 5,931,917 | A | * 8/1999 | Nguyen et al. | 709/250 |
| 5,963,924 | A | * 10/1999 | Williams et al. | 705/40 |
| 5,987,443 | A | * 11/1999 | Nichols et al. | 706/11 |
| 6,014,134 | A | * 1/2000 | Bell et al. | 345/705 |
| 6,356,937 | B1 | * 3/2002 | Montville et al. | 709/206 |

OTHER PUBLICATIONS

Introduction to SILK™ and JAVA–Based Simulation' Kevin J. Healy; Richard A. Kilgore; ThreadTec. Inc., Proceedings of the 1998 Winter Simulation Conference (1998) ACM, D.J. Medeiros, E.F. Watson, J.S. Carson and M.S. Manivannan, eds.*

Web–Based Diagnosis of Model Specifications, E. Joseph Department of Computer science Yenching Graduate Institute, Proceedings of the 1998 Winter Simulation Conference ACM, D.J. Medeiros, E.F. Watson, J.S. Carson, M.S. Manivannan, eds.*

Java–based Mobile Agents, David Wong; Noemi Paciorek; Dana Moore; Communications of the ACM, Mar. 1999 vol. 42. No. 3.*

Next Century Challenges: Data–Centric Networking for Invisible Computing (The Portolano at the University of of Washington) Mike Esler; Jeffrey Hightower; Tom Anderson; Gaetano Borriello; ACM 1999 1–58113–142–9/99/08.*

Atlas: A Case Study in Building a Web–Based Learning Environment using Aspect–oriented Programming, Mik Kersten and Gail C. Murphy; University of British Columbia, ACM (1999) 1–58113–238–7/99/0010.*

* cited by examiner

METHOD FOR SERVING ENGINEERING RULES ON A NETWORK THROUGH SERVLET AND APPLET

BACKGROUND OF THE INVENTION

1. Field of the Invention

The present invention relates generally to a method for promulgating engineering rules and, more specifically, to a method for serving engineering rules on a network in a manner to better ensure uniformity in design applications.

2. Description of the Related Art

Designers and engineers have long relied on reference materials to guide the decision process when creating a tool or product. In the past, engineers have often relied on reference books to identify rules, parameters and intrinsic information. The means for ensuring every engineer had the same tools was to have the same reference materials on every desk. The sheer volume of information currently available to engineers, however, renders the reliance on printed material as a sole source of information obsolete.

In this age of electronics, much of the information required by engineers and designers has been moved from the printed text format to an electronic format. More specifically, information is made available to groups of individuals, through employment or membership, through an electronic network. These networks have dedicated applications and protocols that must be followed to ensure the proper information is retrieved. A major disadvantage to the systems for employers is the requirement to roll out a dedicated application on every computer utilized by every employee to route every employee to have the same resources available thereto. A further hindrance to such proprietary applications is the maintenance thereof. More specifically, each employee must be trained on the proprietary application. The proprietary application must be maintained. And, as equipment is moved or updated, the proprietary application must be reinstalled or remapped on the new equipment utilized by the employee that had been trained thereon. Such network systems are costly and encumber those requiring the reference material.

SUMMARY OF THE INVENTION

Accordingly, the present invention is a method for determining the correctness of proposed data for engineering parameters. The method uses a server side computer and a client side computer connected to each other via an electronic network. The method includes the step of obtaining a knowledge base of data. The method also includes the step of storing the knowledge base of data on the server side computer. The method includes the step of receiving the proposed data from the client side computer via the electronic network. The method also includes the step of comparing the proposed values against the knowledge base of data. The method then incorporates the step of utilizing the server side computer to prepare result data. The method then transmits the result data to the client side computer via the electronic network.

One advantage of the present invention is the ability to provide engineering rules and parameters to a set of individuals. Another advantage of the present invention is that the engineering rules and parameters will be promulgated uniformly to a set of individuals. Yet another advantage of the present invention is that the architecture of the method is resident on a server side computer. Still another advantage of the invention is that the proprietary application does not have to be installed on any of the client side computers being utilized by a set of individuals.

Other features and advantages of the present invention will be readily appreciated, as the same becomes better understood after reading the subsequent description when taken in conjunction with the accompanying drawings.

DETAILED DESCRIPTION OF THE PREFERRED EMBODIMENT(S)

Figure 1:
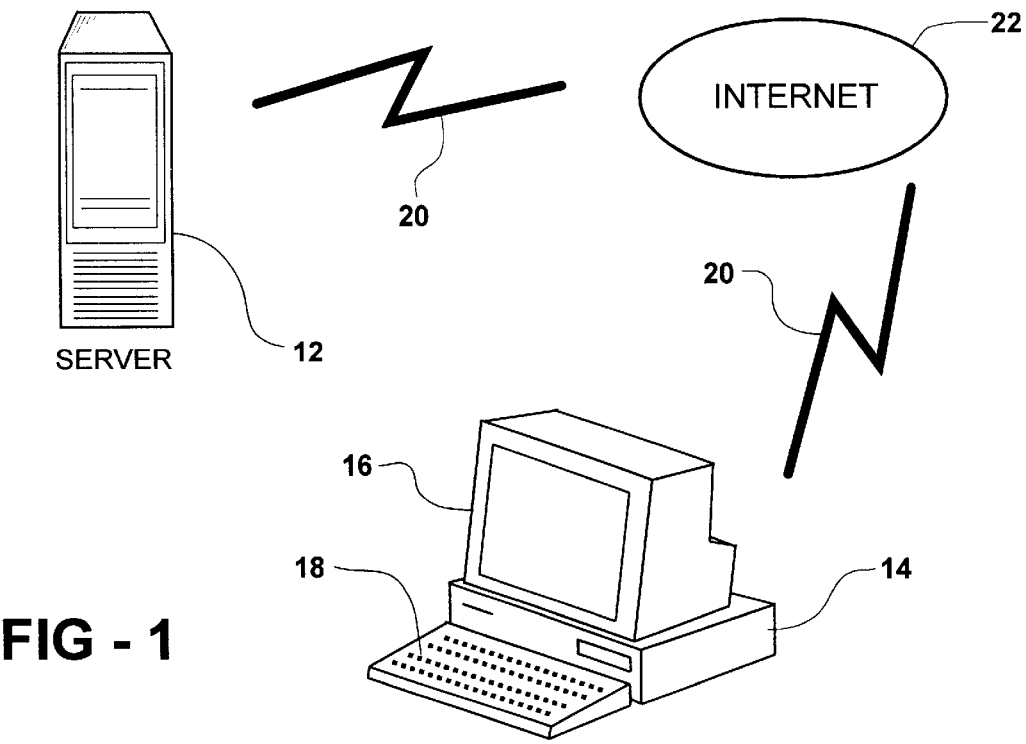
FIG. 1 is a diagrammatic view of a network incorporating the present invention.

Referring to FIG. 1, a network is generally indicated at 10. The network includes a server side computer 12 and a client side computer 14 having a monitor 16 and a keyboard 18. The network 10 includes a transmission medium 20. In FIG. 1, the transmission medium 20 is an electrical conductor which typically is a telephone line. It may be appreciated by those skilled in the art that the transmission medium 20 may be any medium suitable for transmitting electrical currents and/or electromagnetic radiation. While the transmission medium 20 is contemplated as being a telephone line utilizing the Internet 22, it should be appreciated that the transmission medium 20 may be completely internal to a specific site. Conversely, the transmission medium 20 may incorporate the use of a satellite network bridging the network 10 around the world.

Figure 2:
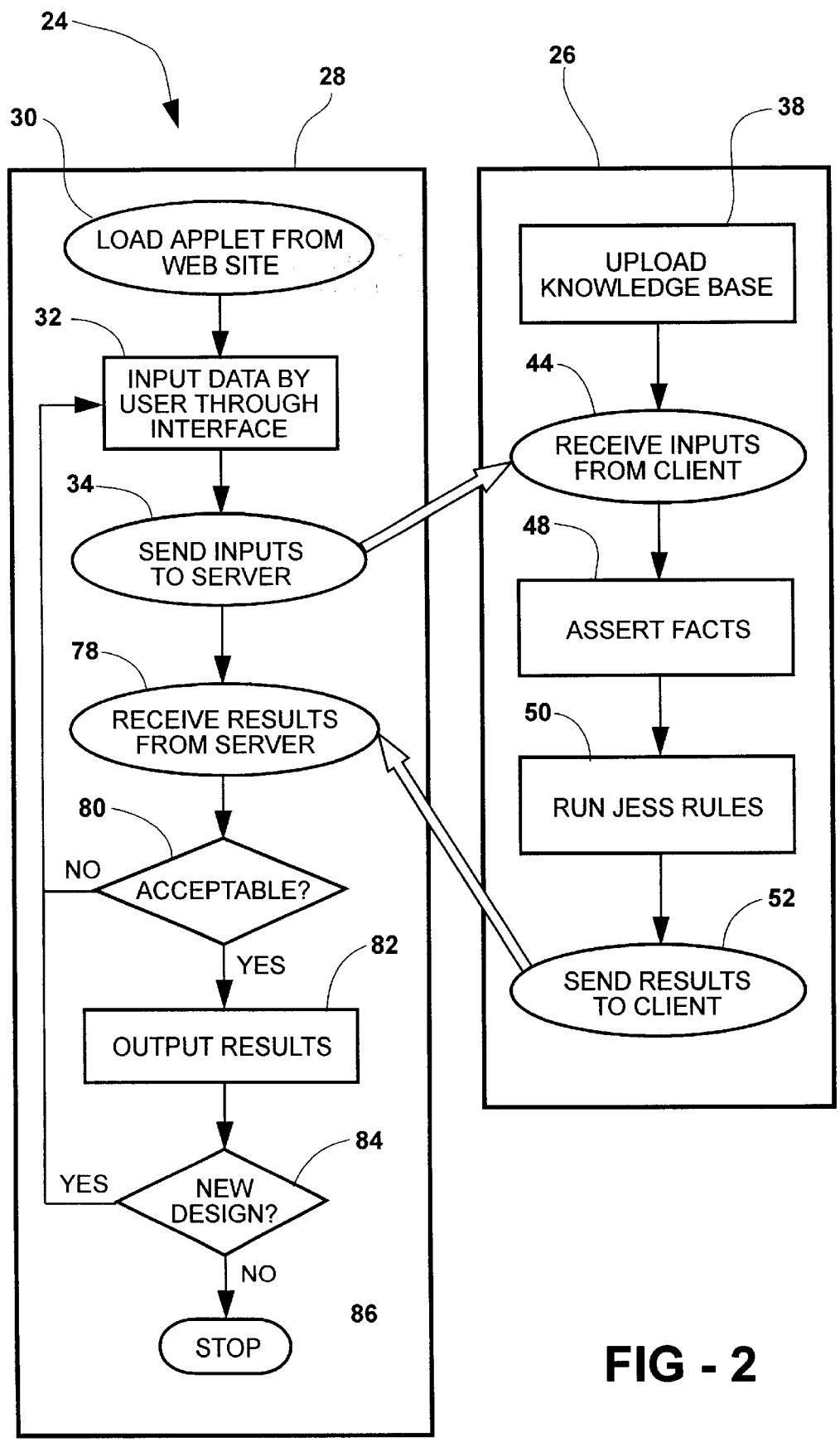
FIG. 2 is a flow chart representing data flow and process flow of one embodiment of the present invention.

Referring to FIG. 2, the present inventive method is generally indicated at 24. The inventive method 24 is separated into two sections. The first section 26 is the portion of the method completed by the server side computer 12. The second section 28 is the portion of the method completed by the client side computer 14. A knowledge base 68 (discussed subsequently) is resident on the server side computer 12. When utilizing the inventive method 24, the user of the client side computer 14 accesses the knowledge base 68 resident on the server side computer 12 and incorporates the use thereof. The knowledge base 68 is obtained through the resources of the entity incorporating the use of the knowledge base 68. Once obtained, the knowledge base 68 is stored on the server side computer 12.

Figure 4:
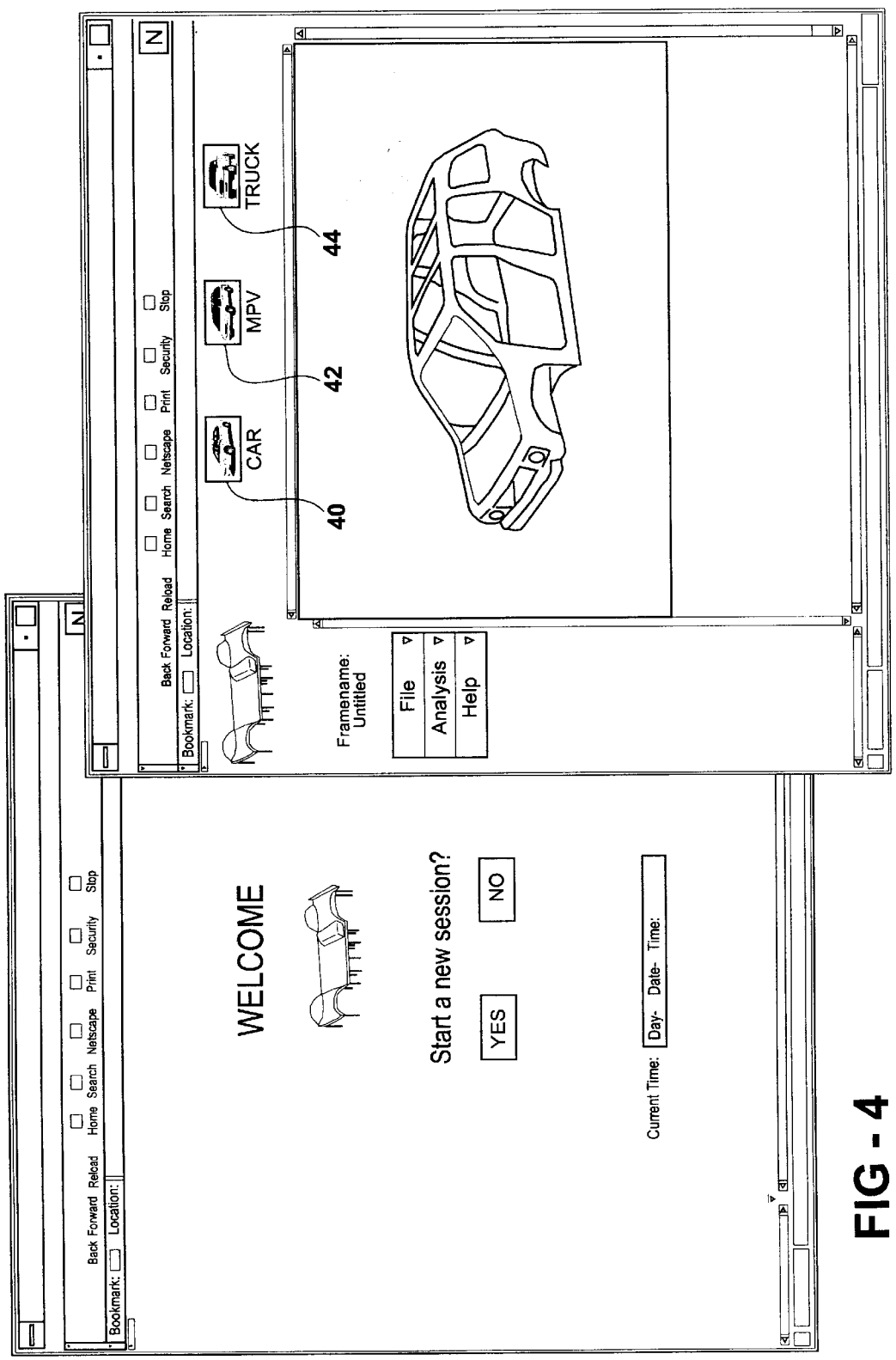
FIG. 4 is a representation of a screen of the output of one embodiment of the present invention.

For a user to invoke the inventive method 24, the user must load an applet from a web site at 30. This is shown in FIG. 4. The applet may be resident on the client side computer 14. Or, in the alternative, the applet may be resident on the server side computer 12 and is transmitted to the client side computer 16 when invoked. The applet is invoked by accessing a particular web site. The web site is accessed using a generic web browser. By loading an applet through a web browser, the client side computer 14 eliminates any requirement for having a proprietary application stored, updated and maintained therein, thus eliminating any need to track which individuals or piece of equipment require access to the knowledge base 68 through dedicated software, i.e., a proprietary application. Conversely, by using a web browser application to access the knowledge base 68, those that wish to monitor access to the knowledge base 68 may do so easily.

Figure 5:
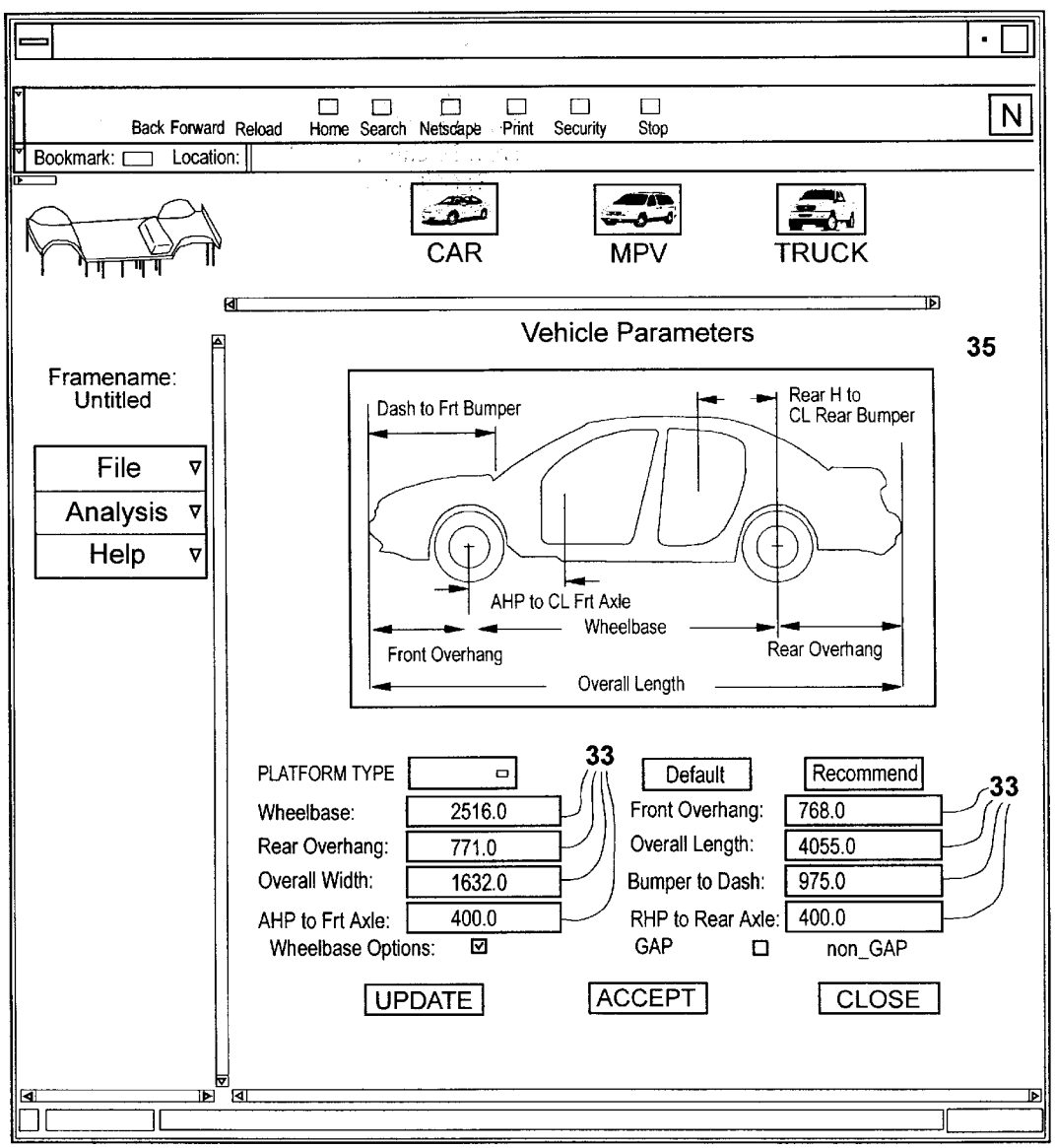
FIG. 5 is a representation of a second screen of the output of one embodiment of the present invention.

Once the applet is loaded, the user inputs data through the interface of the web browser at 32. The form of the data of the input is that of proposed values of the design which are used to specify the product design. The proposed values are values that the user believes could be utilized in a design. The inventive method 24 determines whether the proposed values or parameters are acceptable based on the knowledge base 68 stored in the server side computer 12. As an example of a data input, reference is made to FIG. 5. In this FIG., a screen dump of an example input URL is shown. Values in the form of data are inserted into the specific fields 33. A screen 35 represents a graphic of the definitions of the fields for which data can be entered is shown to aid the user of the inventive method 24.

The data of the proposed values input through the applet are sent to the server side computer 12 at 34. The transmission of data is represented by an arrow 36. The data is transmitted pursuant to HTTP. This hypertext transfer protocol is used in the present invention because this protocol is the backbone of the Internet, the web browser and Java web applications. Because the applet is Java based, HTTP is accepted thereby.

Based on the data transmitted over the transmission medium 20, the server side computer 12 identifies and uploads the specific knowledge base at 38. In many applications, the knowledge base 68 may be so large that it would be impractical to have the server side computer 12 sift through an entire knowledge base to extract specific rules to which the data applies. In FIG. 4, it can be seen that the knowledge base 68 is actually divided into three knowledge bases, any one of which may be uploaded at 38 depending on the data input. By way of example only, the three knowledge bases shown represented on the web site shown in FIG. 4 are CAR 40, MPV 42 and TRUCK 44 knowledge bases.

Once the specific knowledge base 68 has been uploaded at 38, the data transmission as represented by the arrow 36 is received by the server side computer 12 at 46. The data is received over the transmission medium 20 by the client side computer 14. Facts are asserted against the data at 48. The facts are preconditions from which the processes, discussed subsequently, are invoked. The method locates rules having the facts as a part thereof. More specifically, a fact identifies which of the rules to be invoked and used to measure the proposed data that is being entered. The rules are applied to the data at 50. The rules are engineering rules. By way of example, the bending radius of a sheet metal part has to be smaller than six times the sheet metal thickness. In the present invention, JESS is an expert system shell, i.e., a tool used to code engineering rules into the server side computer 12. It should be appreciated by those skilled in the art that any expert system shell may be utilized without adding an inventive step to the present invention.

Figure 3:
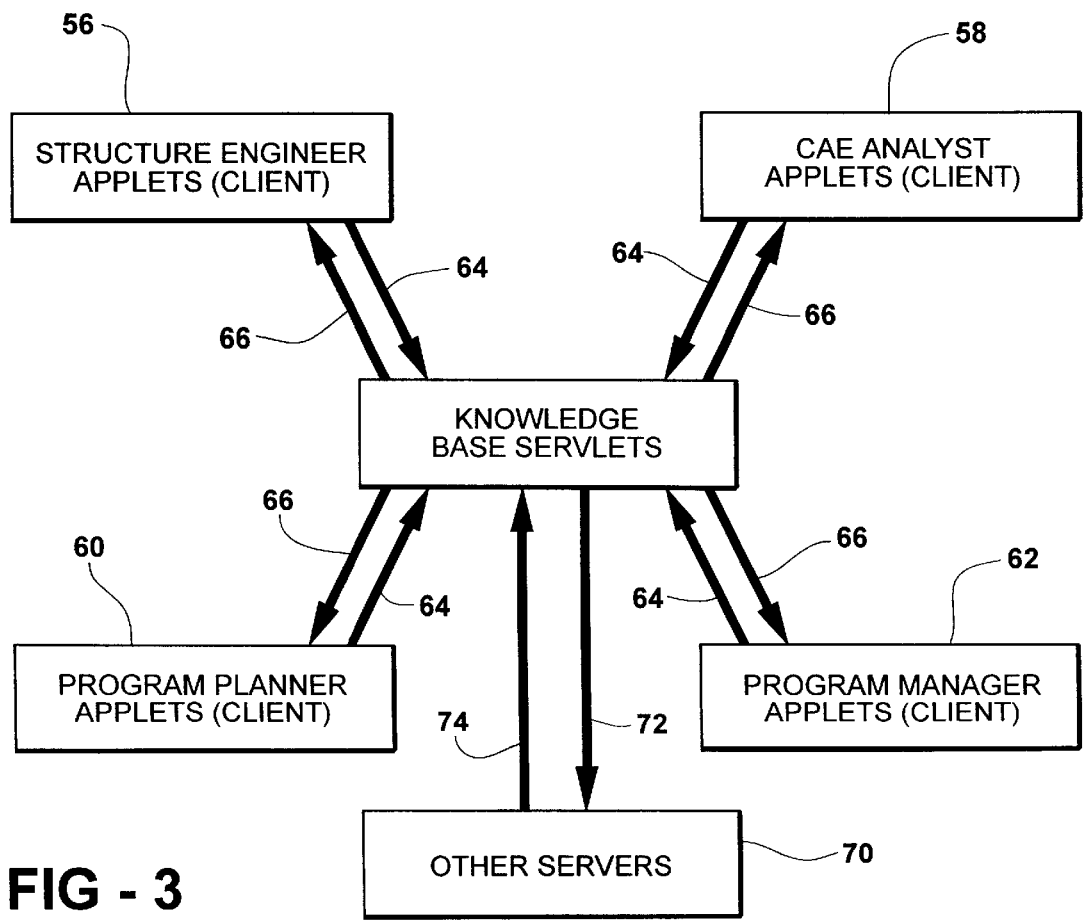
FIG. 3 is a block diagram representing the relationships between client side computers and server side computers as utilized by one embodiment of the present invention.

The data that has passed through the JESS Rules is then sent back to the client side computer 14 at 52. The data is transmitted back over the same or similar transmission medium 20 that it was originally sent over. The data and any related information gathered by passing the data through the knowledge base 68 is sent back to the client side computer 14, represented by arrow 54, in HTTP. Referring to FIG. 3, it can be seen that any number of client side computers 16 may be transmitting data to a knowledge base 68 on one or more server side computers 12 (only one shown). FIG. 3 shows as an example the types of users the present invention would include, but are not limited to, structural engineers 56, CAE analysts 58, program planners 60 and program managers 62. The arrows 64 extending from the client side computers 16 represent inputs of data. They are input using the web browser and sent to the server side computer(s) 12 through the specific URL identifying the specific knowledge base 68 being called. The arrows 66 represent the data being returned to the client side computers 16 once the data has been passed through the appropriate knowledge base 68.

The knowledge base 68 is shown as a servlet. Servlets are protocol and platform-independent server side components, written in Java, which dynamically extend Java enabled servers. They provide a general framework for services, i.e., the facts and rules in steps 48 and 50, built using the request and response paradigm. They can also be deployed in the web using the Java bindings by providing servlet classes. The knowledge base 68 is operated in a manner similar to the applet protocol. It is, however, a servlet as it is an application resident on the server side computer 12 that can invoke and utilize computers 70 other than the server side computer 12. When necessary, the knowledge base servlets 68 send requests to these other server side computers 70 as is graphically represented by arrow 72. The other server side computers 70 send data and rules in the form of responses to the knowledge base servlets 68 as is graphically represented by arrow 74. These responses are used to enhance and modify the knowledge base 68.

Figure 6:
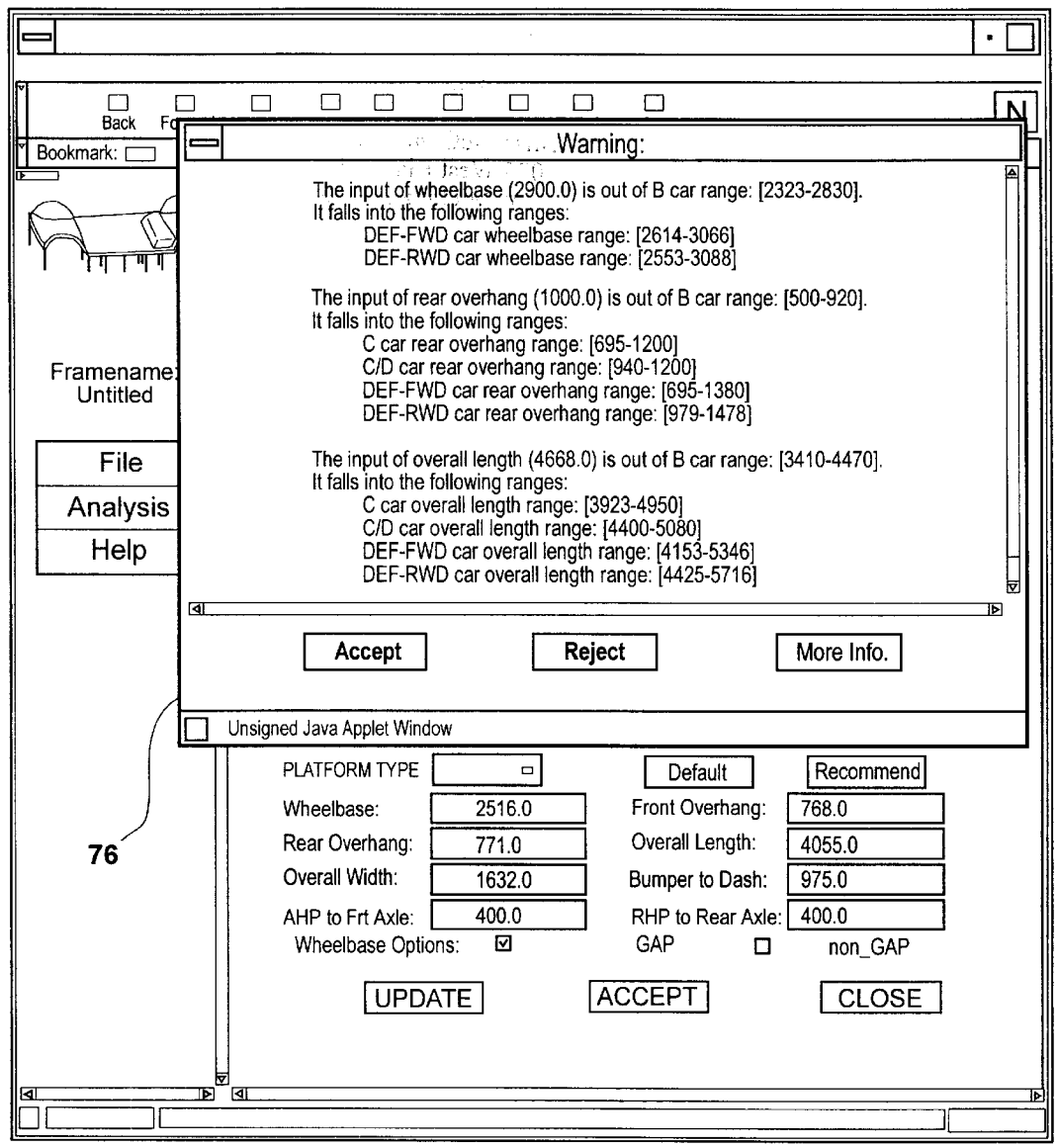
FIG. 6 is a representation of a third screen of the output of one embodiment of the present invention.

Returning to FIG. 2, the data is sent back in HTTP protocol to the client side computer 14 as is graphically represented by arrow 54. A graphic representation of how the results may be displayed is shown in FIG. 6. A pop-up screen 76 shows that the data input at step 32 represented values that were not acceptable based on the knowledge base 68 used. The results indicate that the values were out of the range based on the rules 50 found within the knowledge base 68. These results are received by the client side computer 14 at 78.

The inventive method 24 then determines whether the results are acceptable at 80. If not, the inventive method returns to the input step 32 for new data to be tested against the facts and rules 48, 50 established within the knowledge base 68. If the results are acceptable, the results are output at 82. The inventive method 24 then requests if a new design is going to be tested at 84. If so, the inventive method 24 returns to the input step 32 for new data to be tested against the facts and rules 48, 50 established within the knowledge base 68. If not, the inventive method 24 is stopped at 86.

The present invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A method for determining the correctness of proposed data for engineering parameters using a server side computer and a client side computer connected to each other via an electronic network, the method comprising the steps of:

obtaining a knowledge base of data;

storing the knowledge base of data on the server side computer;

inputting data into an applet by a user on a client side computer;

receiving by the server side computer the inputted data from the client side computer via the electronic network;

identifying and uploading a specific knowledge base from the knowledge base of data by the server side computer based on the inputted data;

asserting facts from the specific knowledge base against the inputted data by the server side computer;

locating rules from the specific knowledge base having the facts as a part thereof by the server side computer;

applying the rules to the inputted data by the server side computer and preparing results data; and transmitting the results data by the server side computer to the client side computer via the electronic network.

2. A method as set forth in claim 1 wherein the knowledge base of data is a servlet receiving data and rules from computers other than the server side computer.

3. A method as set forth in claim 2 including the step of generating the proposed values at the client side computer using an applet.

4. A method as set forth in claim 3 wherein the step of generating the engineering parameters is performed using a web browser.

5. A method as set forth in claim 4 including the step of providing information on the server side computer using a web site.

6. A method as set forth in claim 5 including the step of the client side computer receiving the applet from the web site on the server side computer.

7. A method as set forth in claim 1 including the step of applying the data and queries to tests to determine the validity of the data and queries.

8. A method as set forth in claim 7 including the steps of asserting the data and queries into the knowledge base to determine a set of parameters to guide an output by the server side computer.

9. A method as set forth in claim 8 including the step of transmitting the output over the network to the client computer in an HTTP protocol.

10. A method as set forth in claim 9 including the step of the client side computer receiving the output from the server side computer.

11. A method as set forth in claim 10 including the step of displaying the output on a web browser.

12. A method for determining the correctness of proposed data for engineering parameters using a server side computer and a client side computer connected to each other via an electronic network, the method comprising the steps of:

obtaining a knowledge base of data;

storing the knowledge base of data on the server side computer;

inputting data into an applet by a user on a client side computer;

receiving by the server side computer the inputted data from the client side computer via the electronic network;

identifying and uploading a specific knowledge base from the knowledge base of data by the server side computer based on the inputted data;

asserting facts from the specific knowledge base against the inputted data by the server side computer;

locating engineering rules from the specific knowledge base having the facts as a part thereof by the server side computer;

applying the engineering rules to the inputted data by the server side computer and preparing results data;

transmitting the results data by the server side computer to the client side computer via the electronic network; and determining whether the results data is acceptable.

13. A method as set forth in claim 12 wherein the knowledge base of data is a servlet receiving data and rules from computers other than the server side computer.

14. A method as set forth in claim 3 wherein the step of generating the engineering parameters is performed using a web browser.

15. A method as set forth in claim 13 including the step of providing information on the server side computer using a web site.

16. A method as set forth in claim 14 including the step of the client side computer receiving the applet from the web site on the server side computer.

17. A method for determining the correctness of proposed data for engineering parameters using a server side computer and a client side computer connected to each other via an electronic network, the method comprising the steps of:

obtaining a knowledge base of data;

storing the knowledge base of data on the server side computer;

inputting data into an applet by a user on a client side computer;

receiving by the server side computer the inputted data from the client side computer via the electronic network;

identifying and uploading a specific knowledge base from the knowledge base of data by the server side computer based on the inputted data;

asserting facts from the specific knowledge base against the inputted data by the server side computer;

locating engineering rules from the specific knowledge base having the facts as a part thereof by the server side computer;

applying the engineering rules to the data by the server side computer and preparing results data;

transmitting the results data to the client side computer via the electronic network;

determining whether the results data is acceptable;

returning to the input step for new data if the results data is not acceptable; and outputting results if the results data is acceptable.

18. A method as set forth in claim 15 including the step of the servlets receiving data and rules from the computers other than the server side computer to be utilized during the step of preparing results data.

* * * * *